United States Patent [11] 3,627,885

[72] Inventors Jacques Rondelet;
 Willy Lhoest, both of Rixensart; Bernard Boon, Genval, all of Belgium
[21] Appl. No. 745,708
[22] Filed July 18, 1968
[45] Patented Dec. 14, 1971
[73] Assignee Recherche Et Industrie Therapeutiques, R.I.T.
 Genval, Belgium

[54] STABILIZED ANTIBIOTIC COMPOSITIONS FOR ANIMAL FEEDING
 12 Claims, No Drawings
[52] U.S. Cl. ................................................ 424/177, 424/227, 424/271, 424/357
[51] Int. Cl. ........................................................ A61k 21/00
[50] Field of Search ........................................... 424/357, 177, 227, 271

[56] References Cited
 UNITED STATES PATENTS
 2,879,161 3/1959 Valentine et al. ............. 424/357
 2,951,791 9/1960 Stearns ......................... 424/227
 3,096,242 7/1963 Young .......................... 424/357
 3,101,299 8/1963 Ferrand ........................ 424/357
 3,266,992 8/1966 De Jong ....................... 424/271
 3,424,842 1/1969 Nurnberg ..................... 424/227
 2,990,325 6/1961 Donovick et al. ............. 424/122
 OTHER REFERENCES
 Chem. Abst. Vol. 58 (1963) page 3859b Primary Examiner—Sam Rosen
Attorneys—William H. Edgerton, Richard D. Foggio, Joan S. Keps, Arthur R. Eglington and Alan D. Lourie ABSTRACT: Stabilized antibiotic compositions for animal feeding are prepared by granulation of the antibiotic compound with a compatible silicon oxide or aluminum, calcium or magnesium oxide, carbonate or silicate showing defined specific surface—, water-sorption potency—and water solubility—characteristics. The granulation is carried out in the presence of a binder and, optionally, in the presence of a disintegrator. The granules are adequately calibrated before being dispersed into a suitable feed or premix substrate.

STABILIZED ANTIBIOTIC COMPOSITIONS FOR ANIMAL FEEDING

The present invention relates to stabilized antibiotic compositions useful for the nutrition of animals and to the process for preparing them.

The animal feeds are usually fortified with substances which have specific physiological effects and are hereinafter described as "biologically active substances." Said biologically active substances—examples of which are antibiotics—are normally added to the basic feed in the form of premix on a support which is possibly either inert or of nutritional value, for constituting the fortified feed.

The instability of the antibiotics in the premixes and in the fortified feeds, which instability is also possibly enhanced by the deleterious effect of some components of the feeds (among them, water present in the meals and amines present in fish meals) has long been recognized as a major problem facing the manufacturers and users of feeds and feed concentrates.

The problem is of prime importance, on the one hand, because the amounts of antibiotics are generally limited for economical reasons and, on the other hand, because their action is considerably reduced or even rendered inexistent when, by storage for an extended period and/or in unfavorable conditions as relatively high temperature and/or humidity, their amount is lowered under a minimal critical value which is more or less characteristic for each of them.

It is an object of the present invention to provide novel compositions for animal feeding, containing at least one antibiotic rendered resistant to said adverse conditions.

An additional object of this invention is to provide such stable compositions which are fully active, and from which the active ingredient is readily available.

These and other objects and advantages of the invention will be apparent upon reference to the specification.

It has now surprisingly been found that the stability of antibiotics in compositions for animal feeding is considerably enhanced versus usual degradative factors as for instance extended storage, humidity, temperature and chemical agents when said biologically active ingredients are present in the form of granulated products with at least a compatible chemical compound selected from the class comprising oxides and mineral salts presenting specific physicochemical characteristics, the granulation being carried out in the presence of a binder and, preferably, of a disintegrating agent.

By the term "compatible," it is understood "presenting no physical or chemical deleterious action on the said antibiotic."

Thus, it is the object of the present invention to provide antibiotic compositions for animal feeding wherein the antibiotic is present in the form of a granulated product with a compatible mineral compound selected from the class comprising the silicon oxide and the aluminum, calcium and magnesium oxides, carbonates and silicates, said mineral compound presenting a total specific surface of at least 5—and preferably at least 50—square meters per gram, a water-sorption potency of at least half its own weight and a solubility in water inferior to 1/500 (w/w), the said antibiotic and said mineral compound being compacted by a binder, preferred examples of which are the cellulose others (more particularly, sodium carboxymethylcellulose, methylcellulose, ethylcellulose), gelatin, polyvinylpyrrolidone, agar-agar and lactose, the granules of the granulated product presenting a diameter of at least 0.05 mm. and preferably at least 0.10 mm. (or more particularly comprised between 0.1 and 0.5 mm.), containing from 0.1 to 70 percent of said antibiotic, from 20 to 70 percent of said mineral compound and from 1 to 50 percent of binder, the percentages being expressed on a w/w basis in the granules.

According to a preferred achievement of this invention, a disintegrating agent (e.g. starch) is also present in an amount up to 30 percent of the granulated product. "Granulated product," "premix" and "fortified feed" as indicated above are examples of "compositions" as understood throughout the present specification.

It is obvious that the relative amounts of binder and of disintegrating agent are also depending on specific factors such as nature of the biologically active substance and desired rate of disintegration in the gastrointestinal tract of the animal.

In the same way, the amount of biologically active substance in the granules may be adjusted up to the most convenient range—e.g. from 0.1 percent to 70 percent—for facilitating the dispersion of said substance in the feed.

For preparing the above defined compositions, said antibiotic is mixed and agglomerated with said mineral compound and said binder, the obtained agglomerate being thereafter granulated and calibrated to yield the hereabove defined granules.

The obtained composition (granules) is then easily dispersed in any suitable feed or premix substrate (although another possible achievement consists in using directly the granules as premix).

Wet-granulation processes as well as dry granulation or compaction processes are possibly used for preparing the granulated product defined above.

When using with wet-granulation technique, the antibiotic is thoroughly mixed in the indicated amounts with said oxide or salt, binder and suitable solvent and the obtained agglomerate (paste) is granulated, dried and thereafter adequately calibrated, being understood that the operative conditions be compatible with the stability of said antibiotic. Example of suitable solvents are water, chloroform, alcohols, ketones and other ones known to the art for the wet-granulation technique.

Alternatively, the granulated product defined above may also be obtained by dry compression of the antibiotic-oxide or antibiotic-salt mixture in the indicated amounts, said compression being followed by grinding in order to get the granulated product.

Thus, by the term "granulation" as herein employed, it is understood any granulation procedure known to the art to get granules consisting of physically intricated particles of different powered ingredients, said ingredients being compacted by means of a cementing or binding agent so that the hardness is increased and the surface of the biologically active substance exposed to adverse conditions is considerably reduced (in other words, the apparent density is markedly increased) as the result of the dispersion of said biologically active substance in the cemented mass.

Obviously, different biologically active ingredients and/or above cited oxides and salts and/or binder may be used simultaneously in the hereabove described process. Moreover and although this is not requested for performing the invention, a lubricant may be added without inconvenience. Possible lubricants are magnesium stearate, polyethylene glycol stearate, talc, starch, etc.

It must be noted that the process of this invention does not require the only presence of said oxide or salt as it could be the case in a mixture but a more intimate contact of said oxide or salt with the biologically active ingredient as a result of the granulation.

The present invention is particularly well adapted for stabilizing antibiotics, preferred examples of which are the macrolide-type antibiotics (as for instance oleandomycin and erythromycin), the peptide-type antibiotics (as for instance bacitracin or a derivative thereof), the components of the vernamycin-type antibiotic mixtures (i.e. the components of vernamycin, streptogramin, synergistin, ostreogrycin, pristinamycin, mikamycin and virginiamycin), the tetracycline-type antibiotics (as for instance tetracycline, chlortetracycline and oxytetracycline), aminoglycosidic antibiotics (as for instance streptomycin), and the penicillin-type (natural or semisynthetic) antibiotics.

The following examples are intended to illustrate the preparation of compositions of the invention, but they are not to be construed as limiting the scope thereof.

EXAMPLE 1

Chlortetracycline hydrochloride (525 g.) and methylcellulose (175 g.) are thoroughly mixed with 300 g. of Calflo E (a synthetic calcium silicate having a specific surface of 95 square meters per gram and produced by JOHNS-MANVILLE, New York, N.Y. U.S.A.).

The mixture is moistened with 700 ml. of water until getting a homogeneous thick paste which is run through a stainless steel pharmaceutical rotary wet-granulator, provided with a perforated plate with circular 2-mm. holes.

The obtained granules are dried in a vacuum oven for 24 hours at 45° C.

After drying, the mass is again run through a Stokes oscillating granulator and sifter equipped with an ASTM $N_o40$ screen (sieve opening: 0.42 mm.).

The powder is sifted in a mechanical sieve shaker through a stainless steel ASTM N° 60 sieve (sieve opening: 0.25 mm.). The fines (about 14 percent) are recovered and may be reused as starting material for the granulation of a further batch and the fraction remaining on the sieve, i.e. corresponding to the granules having a diameter comprised between 0.42 mm. and 0.25 mm. is collected. A 100 g. aliquot of calibrated granules is thoroughly mixed with 24.900 kg. of premix substrate for swines feeding (fish meal 6 g., maize meal 40 g., soya meal 15 g., oat flakes 15 g., corn meal 10 g., fat 4 g., water 10 g. for 100 g. of premix substrate) in order to get a final concentration of 2 g. of chlortetracycline hydrochloride per kg. of premix.

For performing the stability test, a 10-gram sample of the composition prepared as described above is kept in a tightly closed vial for 87 hours at 65° C. and a 10-gram sample of a mixture of chlortetracycline hydrochloride, methylcellulose, Calflo E and said premix substrate in the same proportions as for the granulated form is treated in the same degradative conditions.

The assay cylinder-plate method using *Bacillus cereus var. mycoides* ATCC 9634 as the test-organism) performed on both products, using unheated granulated form and mixture form as reference standards indicates that the chlortetracycline content in unchanged (100 percent) for the granulated form while it dropped to 77 percent for the nongranulated form.

EXAMPLE 2

Methylcellulose (250 g.) and 500 g. of zinc bacitracin (63 U/mg.) are thoroughly mixed with 750 ml. of water. There is then added 500 g. of Calflo E (a synthetic calcium silicate having a specific surface of 95 square meters per gram and produced by JOHNS-MANVILLE, New York, N.Y. U.S.A.) while maintaining mixing until getting a homogeneous paste which is granulated by hand, using a stainless steel screen (ASTM No 40) and dried in a vacuum oven at 40° C. for 24 hours.

The dried product is run through a Fitzpatrick comminuting machine equipped with a stainless steel screen with circular 0.8 mm. diameter holes.

The powdered material is sifted in a mechanical sieve shaker equipped with a stainless steel ASTM N° 40 (sieve opening: 0.42 mm.) and a stainless steel ASTM N° 60 sieve (sieve opening: 0.25 mm.). The two extreme fractions (i.e. above 0.42 mm. and below 0.25 mm.) are recovered and may be reused as starting material for the granulation of a further batch. The medium fraction (755 g.), corresponding to the granules having a diameter comprised between 0.42 mm. and 0.25 mm. is collected. A 10 g. aliquot is thoroughly mixed with 2.510 kg. of commercial mixture for swines feeding (middlings 5 g., fish meal 5 g., soybean meal 4 g., oats 10 g., barley 28 g., maize 15 g., milo 10 g., manioc 5 g., alfalfa 2.5 g. vitamin K feed grade 3 g., dicalcium phosphate 1 g., sodium chloride 0.5 g., calcium carbonate 0.25 g., water 10.75 g. for 100 g. of mixture) in order to get a final concentration of 100 units of bacitracin per gram of mixture.

A stability test performed as indicated at the end of example 1 shows that the potency in bacitracin (determined by cylinder-plate method using *Micrococcus flavus* ATCC 10240) is 61 percent for the granulated form and only 44 percent for the nongranulated form.

EXAMPLE 3

Methylcellulose (100 g.) and 250 g. of virginiamycin (corresponding to 310 g. of virginiamycin standard) are thoroughly mixed with 250 g. of Calflo E (a synthetic calcium silicate having a specific surface of 95 square meters per gram and produced by JOHNS-MANVILLE, New York, N.Y., U.S.A.).

The mixture is moistened with 400 ml. of water until getting a homogeneous paste which is then forced through as ASTM N° 40 stainless steel screen (sieve opening: 0.42 mm.) and the vermiculated mass is desiccated in a vacuum oven for 12 hours at 45° C.

The dried product is then forced through the same screen as above and sieved on an ASTM N° 60 stainless screen (sieve opening: 0.25 mm.).

A 6 g. aliquot of the fraction comprised between the 0.25 and 0.42 mm. size is collected and thoroughly mixed with 1.544 kg. of premix substrate for swines feeding (fish meal 6 g., maize meal 40 g., soya meal 15 g., oat flakes 15 g., corn meal 10 g., fat 4 g., water 10 g. for 100 g. of premix substrate) to get a final concentration of 2 g. of virginiamycin standard per kg. of premix.

A stability test performed as indicated at the end of example 1, using a microbiological method (paper disk diffusion method on agar-agar using *Corynebeacterium xerosis* NCTC 9755) for determining the potency in total antibiotic content and a chemical method (spectrophotometric absorbance at 520 m$\mu$ of the reaction product with p.dimethylaminobenzaldehyde) for determining the potency in factor-M-type component indicates for the granulated form, a potency of 95 percent by the chemical assay and of 97.5 percent by the microbiological assay. Under the same conditions, the nongranulated form gives 38 and 47 percent respectively.

EXAMPLE 4

Methylcellulose (17 g.) starch (16 g.) and 27.5 g. of virginiamycin (corresponding to 49.5 g. of virginiamycin standard) are thoroughly mixed with 40 g. of Calflo E (a synthetic calcium silicate having a specific surface of 95 square meters per gram and produced by JOHNS-MANVILLE, New York, N.Y., U.S.A.).

The mixture is moistened with 80 ml. of water until getting a homogeneous paste which is then forced through an ASTM N° 40 stainless steel screen (sieve opening: 0.42 mm.) and the vermiculated mass is dried in a vacuum oven for 20 hours at 45° C.

The dried product is forced through an ASTM N° 40 and then sifted on an ASTM N° 60 stainless screen (sieve opening: 0.25 mm.).

A 4 g. aliquot of the fraction comprised between the 0.25 and 0.42 mm. size is collected and thoroughly mixed with 981 g. of premix substrate for swines feeding (fish meal 6 g., maize meal 40 g., soya meal 15 g., oat flakes 15 g., corn meal 10 g., fat 4 g., water 10 g. for 100 g. of premix substrate) to get a final concentration of 2 g. of virginiamycin standard per kg. of premix.

A stability test performed as indicated at the end of example 1, using a microbiological method for determining the potency in total antibiotic content and a chemical method for determining the potency in factor-M-type component (both indicated in example 3) shows for the granulated form, a potency of 93 percent by the chemical assay and of 96 percent by the microbiological assay. Under the same conditions, the nongranulated form gives 40 and 48 percent respectively.

EXAMPLE 5

Methylcellulose (400 g.) and 12 g. of virginiamycin corresponding to 22 g. of virginiamycin standard) are thoroughly mixed in a kneader-mixer with 800 g. of Calflo E (a synthetic calcium silicate having a specific surface of 95 square meters per gram and produced by JOHNS-MANVILLE, New York, N.Y., U.S.A.) and with 800 g. of Perlite J-2 (a silicium oxide produced by JOHNS-MANVILLE, New York, N.Y., U.S.A.).

The mixture is moistened with 1,350 ml. of water until getting a homogeneous hard paste which is passed through a rotary wet granulator provided with a stainless steel perforated plate with circular 3 mm. diameter holes.

The vermiform mass is dried in a vacuum oven at 45° C. for 48 hours and then ground in a Fitzpatrick comminuting machine equipped with a stainless steel perforated plate with circular 1.63 mm. diameter holes.

The powder is sifted in a mechanical sieve shaker equipped with a stainless steel ASTM N° 40 sieve (sieve opening: 0.42 mm.) and a stainless steel ASTM N° 60 sieve (sieve opening: 0.25 mm.). The two extreme fractions (i.e. above 0.42 mm. and below 0.25 mm.) are recovered for regranulation and the fraction (1.400 kg.) corresponding to the granules having a diameter comprised between 0.42 and 0.25 mm. is collected.

A 3 g. aliquot is thoroughly mixed with 325 g. of commercial feed for swines feeding (middlings 5 g., fish meal 5 g., soybean meal 4 g., oats 10 g., barley 28 g., maize 15 g., milo 10 g., manioc 5 g., alfalfa 2.5 g., vitamin K feed grade 3 g., dicalcium phosphate 1 g., sodium chloride 0.5 g., calcium carbonate 0.25 g., water 10.75 g. for 100 g. of mixture) to get a final concentration of 100 mg. of virginiamycin standard per kg. of mixture.

A stability test performed as indicated at the end of example 1, using a microbiological method as indicated in example 3 for determining the potency in total antibiotic content shows, for the granulated form, a potency of 87 percent. Under the same conditions, the nongranulated form gives 25 percent.

EXAMPLE 6

The technique is that described in example 5 but there is employed 800 g. of tricalcium phosphate instead of the 800 g. of Perlite J-2 therein specified.

In this way there is obtained a premix showing at the end of the stability test described in example 1 a potency of 83 percent by the microbiological assay (indicated in example 3). Under the same conditions, the nongranulated form gives 28 percent.

EXAMPLE 7

Methylcellulose (100 g.) and 250 g. of virginiamycin (corresponding to 300 g. of virginiamycin standard) are thoroughly mixed with 250 g. of Calflo C (a synthetic calcium silicate having a specific surface of 175 square meters per gram and produced by JOHNS-MANVILLE, New York, N.Y., U.S.A.).

The mixture is moistened with 400 ml. of water until getting a homogeneous paste which is then forced by a piston under a pressure of 5 kg. per square centimeter through a stainless steel perforated plate presenting circular 0.5 mm. diameter holes.

The vermiculated mass is dried in a vacuum oven for 12 hours at 45° C. and ground in a laboratory hammer mill equipped with a stainless steel screen having circular 2 mm. diameter holes.

The product is then sifted successively through an ASTM N° 40 and an ASTM N° 60 stainless steel screen and the intermediate fraction (250 g.) is collected, the two other fractions being recovered for regranulation.

A 10 g. aliquot of the intermediate fraction is mixed with 1.990 kg. of premix substrate for swines feeding (fish meal 6 g., maize meal 40 g., soya meal 15 g., oat flakes 15 g., corn meal 10, fat 4 g., water 10 g. for 100 g. of premix substrate) in order to get a final concentration of 2.5 g. of virginiamycin standard per kg. of premix.

A stability test performed as indicated at the end of example 1, using a microbiological method for determining the potency in total antibiotic content and a chemical method for determining the potency in factor-M-type component (both methods indicated in example 3) shows for the granulated form, a potency of 82 percent by the chemical assay and of 90 percent by the microbiological assay. Under the same conditions, the nongranulated form gives 25 and 30 percent respectively.

EXAMPLE 8

The technique is that described in example 3 but the amount of Calflo E is respectively replaced by the different compounds listed in the following table I to yield premixes, the respective stabilities of which are indicated in regard of each compound in the same table I (the antibiotic content is determined according to the chemical method described in example 3).

TABLE I

| Mineral compound | Stability (%) |
| --- | --- |
| Calflo C (1) | 83.5 |
| Magnesium carbonate | 79 |
| Calcium carbonate | 84 |
| Magnesium oxide | 79.8 |
| Calcium oxide | 90 |
| Aluminum oxide | 86 |
| Kieselgel G (2) | 80 |
| Aerosil standard (3) | 81.8 |

1. a synthetic calcium silicate having a specific surface of 95 square meters per gram and produced by JOHNS-MANVILLE, New York, N.Y., U.S.A.).
2. a purified silicon oxide produced by E. Merck, Darmstadt, Germany (W).
3. a purified silicon oxide having a specific surface of 175 square meters per gram and produced by DEGUSSA, Frankfurt A/M Germany (W).

EXAMPLE 9

The technique is that described in example 3 but the methylcellulose is respectively replaced by the different binders listed in the following table II to yield premixes, the respective stabilities of which are indicated in regard of each binder in said table II (the antibiotic content is determined according to the chemical method described in example 3).

TABLE II

| Binder | Stability (%) |
| --- | --- |
| gelatin | 88 |
| agar-agar | 85 |
| carboxymethylcellulose | 88.5 |
| polyvinylpyrrolidone | 86 |

EXAMPLE 10

Methylcellulose (1 g.) and 2 g. of pristinamycin (pharmaceutical grade) are thoroughly mixed with 2 grams of Calflo E (a synthetic calcium silicate having a specific surface of 95 square meters per gram and produced by JOHNS-MANVILLE, New York, N.Y., U.S.A.).

The mixture is moistened with 4 ml. of water until getting a homogeneous paste which is then forced through as ASTM N° 40 stainless steel screen (sieve opening : 0.42 mm.) and the vermiculated mass is desiccated in a vacuum oven for 12 hours at 45° C.

The dried product is then forced through the same screen as above and sieved on an ASTM N° 60 stainless screen (sieve opening: 0.25 mm.).

A one gram aliquot of the fraction comprised between the 0.25 and 0.42 mm. size is collected and thoroughly mixed with 0.200 kg. of premix substrate for swines feeding (fish meal 6 g., maize meal 40 g., soya meal 15 g., oat flakes 15 g., corn meal 10 g., fat 4 g., water 10 g. for 100 g. of premix substrate) to get a final concentration of 2 mg. of antibiotic per gram of premix.

A stability test performed N.Y. indicated at the end of example 1, using for determining the potency in "factor PII" the chemical method indicated in example 3 for factor M, shows for the granulated form, a potency of 92 percent. Under the same conditions, the potency of nongranulated form drops to 74 percent.

EXAMPLE 11

Methylcellulose (1 g.) and 2 g. of procaine penicillin are thoroughly mixed with two grams of Calflo E (a synthetic calcium silicate having a specific surface of 95 square meters per gram and produced by JOHNS-MANVILLE, New York, N.Y. U.S.A.).

The mixture is moistened with four ml. of water until getting a homogeneous paste which is then forced through an ASTM No. 40 stainless steel screen (sieve opening: 0.42 mm.) and the vermiculated mass is dessicated in a vacuum oven for 12 hours at 45° C.

The dried product is then forced through the same screen as above and sieved on an ASTM No 60 stainless screen (sieve opening: 0.25 mm.).

A 1-gram aliquot of the fraction comprised between the 0.25 and 0.42 mm. size is collected and thoroughly mixed with 0.250 kg. of premix substrate for swines feeding (fish meal 6 g., maize meal 40 g., soya meal 15 g., oat flakes 15 g., corn meal 10 g., fat 4 g., water 10 g. for 100 g. of premix substrate) to get a final concentration of 1,600 I.U. per gram of premix.

A stability test performed as indicated at the end of example 1 but for 5 days instead of 87 hours and using a microbiological method (cylinder-plate method using *Microccus pyogenes var. aureus* ATCC No 6538P as the test organism) for determining the potency in penicillin indicates for the granulated form a potency of 87.7 percent. Under the same conditions, the potency of the nongranulated form drops to 71 percent.

EXAMPLE 12

Methylcellulose (1 g.) and 2 g. of factor M of virginiamycin are thoroughly mixed with 2 g. of Calflo E (a synthetic calcium silicate having a specific surface of 95 square meters per gram and produced by JOHNS-MANVILLE, New York, N.Y., U.S.A.).

The mixture is moistened with 4 ml. of water until getting a homogeneous paste which is then forced through an ASTM No 40 stainless steel screen (sieve opening: 0.42 mm.) and the vermiculated mass is desiccated in a vacuum oven for 12 hours at 45° C.

The dried product is then forced through the same screen as above and sieved on an ASTM No 60 stainless screen (sieve opening 0.25 mm.).

A 1-gram aliquot of the fraction comprised between the 0.25 and 0.42 mm. size is collected and thoroughly mixed with 0.200 kg. of premix substrate for swines feeding (fish meal 6 g., maize meal 40 g., soya meal 15 g., oat flakes 15 g., corn meal 10 g., fat 4 g., water 10 g. for 100 g. of premix substrate) to get a final concentration of 2 mg. per gram of premix.

A stability test performed as indicated at the end of example 1, using for determining the potency in factor M the chemical method indicated in example 3, shows for the granulated form a potency of 98 percent. Under the same conditions, the potency of nongranulated forms drops to 62.5 percent.

EXAMPLE 13

The technique is that described in example 12 but the amount of factor M is replaced by 2 g. of factor S.

A stability test performed on the granulated form using a spectrofluorimetric method (excitation at 312 m$\mu$, emission at 444 m$\mu$) for determining the potency in factor S indicates a potency of 99 percent.

What we claim is:

1. An antibiotic composition for animal feeding wherein the antibiotic is present in the form of a granulated product with a compatible mineral compound selected from the group consisting of silicon oxide and the aluminum, calcium and magnesium oxides, carbonates and silicates, said mineral compound presenting a total specific surface of at least 5 square meters per gram, a water-sorption potency of at least half its own weight and a solubility in water inferior to 1/500 (w/w), said antibiotic and mineral compound being compacted with a binder to form granules, the granules of the granulated product presenting a diameter of at least 0.05 mm. and containing from 0.1 to 70 percent of said antibiotic, from 20 to 70 percent of said mineral compound and from 1 to 50 percent of binder (on w/w basis) said antibiotic being selected from the group consisting of chlortetracycline, zinc bacitracin, virginiamycin, virginiamycin factor M, virginiamycin factor S, pristinamycin and procaine penicillin.

2. An antibiotic composition according to claim 1 wherein the compatible mineral compound is calcium silicate.

3. An antibiotic composition according to claim 1 wherein the compatible mineral compound is aluminum oxide or silicon oxide.

4. An antibiotic composition according to claim 2 wherein the diameter of the granules is between 0.1 and 0.5 mm.

5. A premix for animal feeding comprising at least one antibiotic composition according to claim 1 dispersed in a premix substrate.

6. An animal feed comprising at least one antibiotic composition according to claim 1 dispersed in a feed substrate.

7. A premix for animal feeding comprising an antibiotic composition according to claim 9 dispersed in a premix substrate.

8. An animal feed comprising an antibiotic composition according to claim 9 dispersed in a feed substrate.

9. An antibiotic composition according to claim 1 wherein the antibiotic is virginiamycin.

10. An antibiotic composition according to claim 1 wherein the antibiotic is procaine penicillin.

11. An antibiotic composition according to claim 1 wherein the antibiotic is pristinamycin.

12. The antibiotic composition according to claim 9 wherein the compatible mineral compound is calcium silicate.

* * * * *